May 12, 1942.   C. K. STOTZ   2,282,681
NASAL FILTER
Filed Aug. 14, 1939
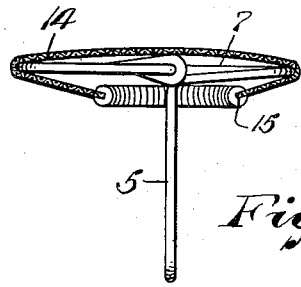
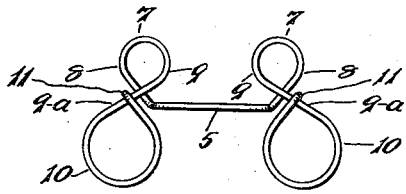
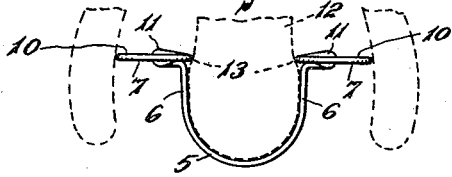
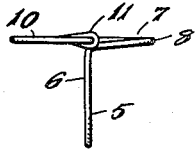
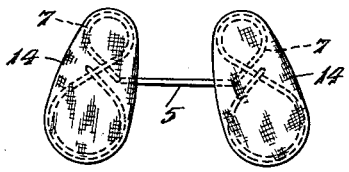
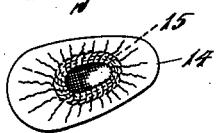
INVENTOR.
CHARLES K. STOTZ.
BY Louis V. Lucia
ATTORNEY.

Patented May 12, 1942

2,282,681

UNITED STATES PATENT OFFICE 2,282,681

NASAL FILTER

Charles K. Stotz, Farmington, Conn., assignor to The Cha-Gobé Company, a corporation of Connecticut Application August 14, 1939, Serial No. 290,064

3 Claims. (Cl. 128—148)

This invention relates to new and useful improvements in nasal filters and has, for an object thereof, to provide a filter for the nasal passages which is particularly adapted for use in filtering the air that is breathed through said passages from dust or pollen of different natures.

A further object of the invention is to provide a filter which is of simple construction, economical to manufacture and which may be readily placed and maintained in its position within the nasal passages.

A further object is to provide such a filter with washable filter cloths that may be readily attached thereto and replaced when necessary.

The said invention has been found highly efficient in filtering the air from pollen, such as that which causes hay fever, so that a great deal of relief is obtained and, in some cases, hay fever is entirely prevented by the use thereof.

Further objects of the invention will be clearly understood from the following description and from the accompanying drawing in which:

Figure 1 is a plan view, on an enlarged scale, illustrating the frame of a nasal filter embodying my invention.

Figure 2 is a rear view thereof.

Figure 3 is a side view thereof.

Figure 4 is a plan view of my improved nasal filter with the filter cloth mounted thereon.

Figure 5 is a side view of the frame showing one of said filter cloths thereon, in central vertical section.

Figure 6 is a bottom view of one of said filter cloths.

As illustrated in the drawing, my invention provides a frame which is formed from a single piece of suitable wire which is formed to provide a U-shaped bridge portion 5 with side extensions 6; the ends of which are formed to provide shields 7 that are disposed at right angles thereto. The said shields are provided by forming the wire in the shape of a figure 8 which consists of a small, circular loop 8 that is curved inwardly on said bridge, as at 9, and again bent inwardly to provide a large loop 10. Each end of the wire is hooked downwardly over the portion 9—a, as at 11, to eliminate the projection of ragged or sharp edges upon the flat surface of the shields.

It will be noted that the loops 8 are smaller than the loops 10; thus tapering the shields to conform with the shape of the nasal passages at the nostrils, and that the bridge 5 is located between and near the longitudinal center of said shields so that, when the filter is attached to the nose, said bridge will rest in position under the cartilage septum 12.

The extensions 6 are connected with the shields at points slightly inward of their inner edges so that the edges of said shields will project inside of the extensions and thereby permit them to grip the cartilage septum at opposite points and above its enlarged portion, as indicated at 13, to retain the filter in proper position within the nasal passages.

Filters 14 having suitable filtering qualities, and preferably of cloth material, are mounted upon each of the shields 7 and supported by said shields within the nasal passage. The said filters are provided with an elastic member 15 that is sewn along the edge of the material by suitable means, such as overedge stitching or the like, and draws the edges of the filter blank inwardly, forming the filters in the shape of a pouch which can be readily stretched open and applied over the shields 7 in the position clearly illustrated in Figure 4. The elastic member 15 will then draw the said edges inwardly to enclose the shields within the pouch and thereby securely retain the filters on the shields in a stretched condition.

It will be readily understood that, in the application and use of my invention, the said filtering cloths 14 will be held by the shields 7 in position to extend entirely across each of the nasal passages and thereby filter all air passing through said passages from dust, pollen or other foreign matter.

If it is desired, the said filter cloth may be saturated with a medicant so that the air will become infused with the said medicant and gradually draw it into the nasal passages, throat and lungs by natural respiration.

I claim:

1. A device of the character described comprising a frame having a U-shaped portion, and a shield portion substantially in the shape of a figure 8 extending from each side of said bridge portion for supporting a filter member.

2. A device of the character described comprising a frame constructed from a single piece of wire and including a U-shaped bridge portion having a portion of said wire extending laterally from each end thereof and looped to provide a shield in the shape of a figure 8 for supporting a filter thereon.

3. A device of the character described constructed of a single piece of wire and including a U-shaped bridge portion; portions of said wire being bent substantially at right angles from the ends of said U-shaped portion and formed to provide shields in the shape of a figure 8 for supporting filter members thereon; the ends of said wire being hooked downwardly around a portion of said shields to remove them from contact with said filter members.

CHARLES K. STOTZ.